July 3, 1923.
W. E. STONE
1,460,866
DIRIGIBLE LIGHT FOR AUTOMOBILES
Filed March 7, 1921     2 Sheets-Sheet 1
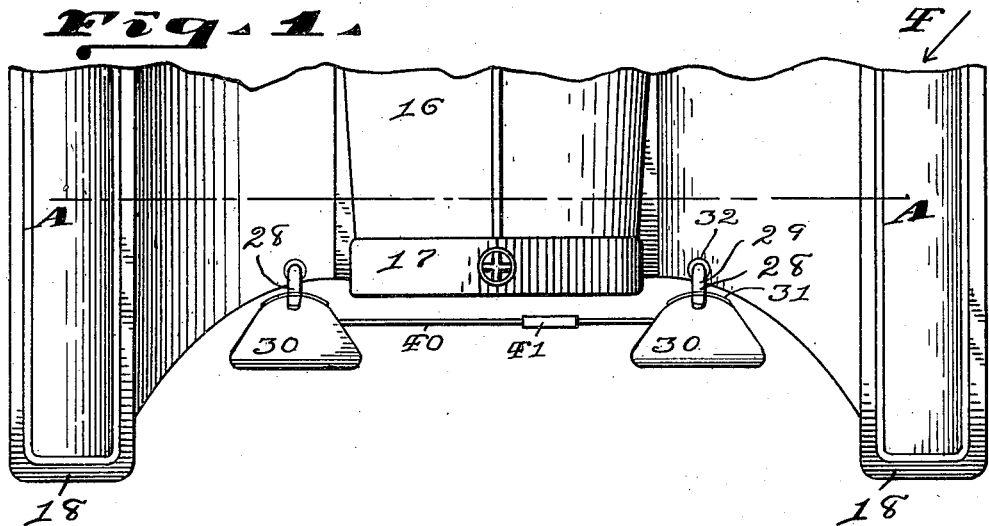
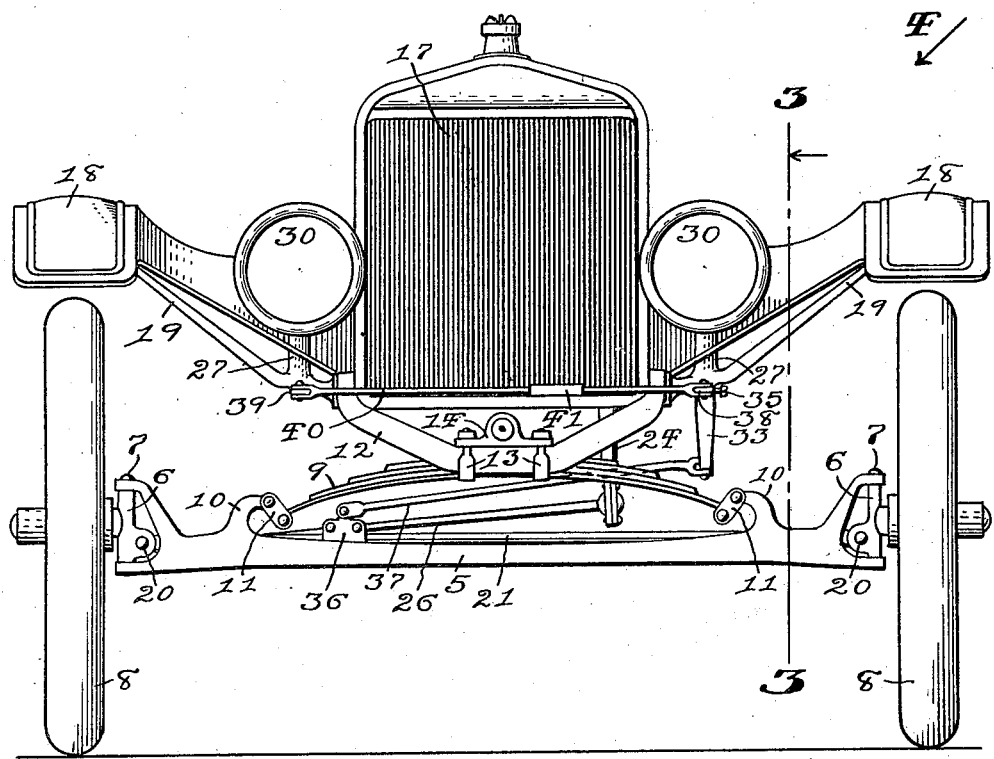
Inventor—
William E. Stone,
By Frank P. Shepard.
Attorney

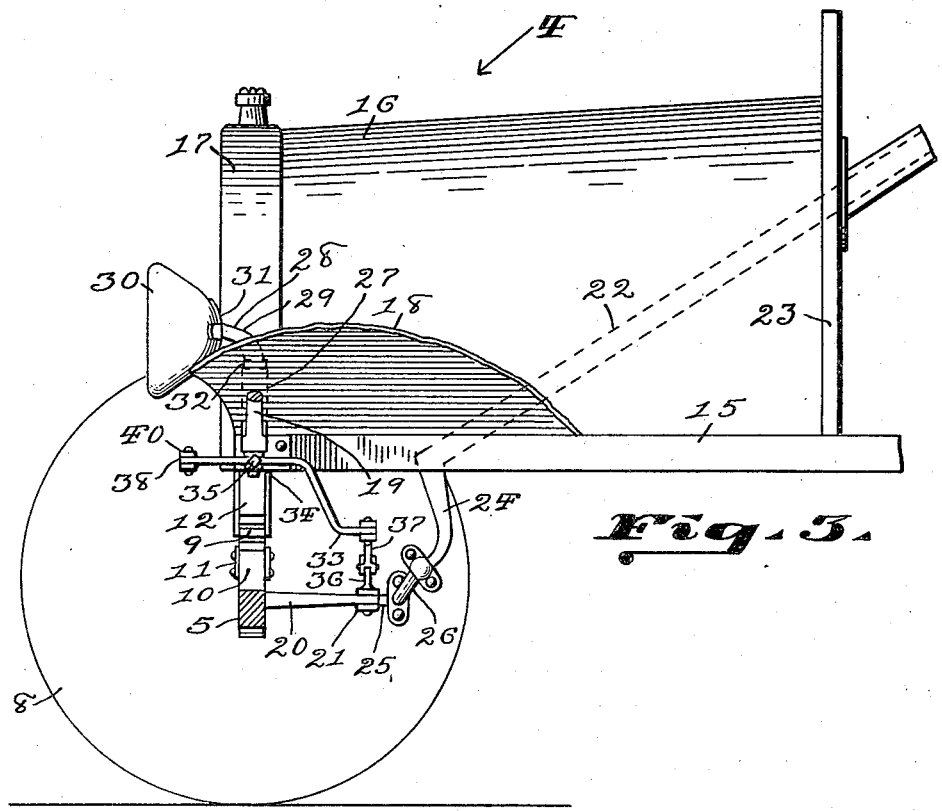

Patented July 3, 1923.

1,460,866

UNITED STATES PATENT OFFICE.

WILLIAM E. STONE, OF OKLAHOMA, OKLAHOMA.

DIRIGIBLE LIGHT FOR AUTOMOBILES.

Application filed March 7, 1921. Serial No. 450,262.

*To all whom it may concern:*

Be it known that I, WILLIAM E. STONE, a citizen of the United States, and a resident of Oklahoma city, in the county of Oklahoma and State of Oklahoma, have invented certain Improvements in Dirigible Lights for Automobiles, of which the following is a specification, reference being had to the accompanying drawings.

The invention pertains to improvements in dirigible lights for automobiles, an object being to simplify the mechanism required to support the lights and control their movements.

Other objects and advantages of the invention will be set forth in the ensuing description.

Figure 1 of the accompanying drawings is a plan view of the front end of the well known "Ford" automobile, showing the improvement of the means employed to support and control the lights.

Figure 2 is a front elevation of the parts shown in Figure 1.

Figure 3 is a sectional view taken on the line 3—3 of Figure 2.

Figure 4 is a perspective view of certain parts, looking in the direction of the arrows 4 in Figures 1 to 3.

Like characters of reference designate like parts in all the figures.

The automobile shown in this instance includes the front axle 5; the knuckles 6 which are pivoted to the ends of the axle by vertical pivot-pins 7; the ground wheels 8 which are pivoted to said knuckles; the front spring 9 whose ends are connected to perch supports 10 on the axle by toggle links 11; the cross member or bolster 12 which is secured to the spring by U-bolts 13 and a clamping-plate 14; and the side rails 15 whose front ends are secured to the ends of the cross-member 12.

The automobile further includes the engine housing 16 and radiator 17 which are supported by the side rails 15.

The sheet-metal fenders 18 are secured to the side rails 15 in the usual manner, and the outer portions of these fenders are supported by outwardly and upwardly extending arms 19 which are in turn secured to the front ends of the side rails 15 as best shown in Figures 2 and 3.

Each knuckle 6 is provided with the usual rearwardly-extending arm 20, and the two arms 20 are operatively connected by the tie-rod 21.

The steering-shaft 22 is journaled through the front-board 23 and through the engine housing 16 and provided on its lower or front end with the usual crank 24.

The crank 24 is operatively connected to a rearwardly-extending lug 25 on the tie-rod 21 by the steering-rod 26 which has ball-and-socket connection with said crank and lug.

The parts thus described are well known to users of Ford automobiles.

In arranging to support and operate the lights, each of the supporting arms 19 is provided with a vertical tubular standard 27, as best shown in Figure 4; this standard being preferably rigid with said arm.

This standard 27 extends up tightly through the adjacent fender 18 above its supporting arm 19, and thus connects said arm and fender and the side rails 15 into a more solid structure.

A vertical shaft 28 is journaled through each standard 27, the upper end of each shaft being curved forward as at 29 and secured to the rear side of a lamp 30 by a suitable spider 31.

Each shaft 28 is provided with a tight collar 32 which rests on the top of its standard 27.

With the lamps 30 supported in this way, they may be turned to direct light to the right or left, according to the direction the automobile is to be steered.

To cause the lamps 30 to follow the movements of the steering apparatus, one of the lamp-supporting shafts 28—the left-hand one in this instance—is provided on its lower end with a crank 33 which extends downward and rearward, the hub 34 of this crank embracing the shaft 28 and being secured thereto by a set-screw 35.

The rear end of the crank 33 is operatively connected to an upstanding lug 36 on the tie-rod 21 by a rod 37 which pivotally engages said crank and lug.

It will be seen that when the tie-rod is moved for steering the wheels 8, the crank 33 is also swung by the rod 37 in a direction to have the left-hand lamp 30 follow the movements of said wheels.

In order to move the right-hand lamp 30, the shaft 28 of the left-hand lamp is provided with forwardly-extending crank 38 which may be integral with the hub 34 of the crank 33.

The shaft 28 of the right-hand lamp 30 is provided with a similar crank 39, and the front ends of the two cranks 38 and 39 are connected together by a tie-rod 40 which is pivoted to them both.

This tie-rod 40 may be provided with a turn-buckle 41 to adjust its length.

The following is claimed:—

In a dirigible light mechanism for automobiles, a vehicle body, fenders, upwardly inclined fender-supporting arms attached to the front ends of the side rails of said body and each provided with a vertical tubular standard extended tightly through the adjacent fender above its supporting arm and connecting said arm, fender and side rails solidly together, a vertical shaft journaled through each standard and having curved upper end, a spider on the end of said curved portion, a crank on the lower end of each of said shafts, a tie rod and arms connecting the knuckles of the steering mechanism, a rod connecting the rear ends of said cranks, and a steering rod for actuating said tie rod.

Witness my hand this 17th day of February, 1921.

WILLIAM E. STONE.